US012797829B2

(12) United States Patent
Wang et al.

(10) Patent No.: US 12,797,829 B2
(45) Date of Patent: Nov. 17, 2026

(54) COMPOSITE PHOTOCATALYST OF CLAY BASED BISMUTH PHOSPHATE HOMOJUNCTIONS, PREPARATION METHOD AND APPLICATION THEREOF

(71) Applicant: Wuhan University of Technology, Wuhan (CN)

(72) Inventors: Junting Wang, Wuhan (CN); Han Lin, Wuhan (CN); Gaoke Zhang, Wuhan (CN); Hongyi Yue, Wuhan (CN); Yuan Li, Wuhan (CN)

(73) Assignee: Wuhan University of Technology, Wuhan (CN)

( * ) Notice: Subject to any disclaimer, the term of this patent is extended or adjusted under 35 U.S.C. 154(b) by 521 days.

(21) Appl. No.: 18/508,282

(22) Filed: Nov. 14, 2023

(65) Prior Publication Data

US 2024/0157337 A1 May 16, 2024

(30) Foreign Application Priority Data

Nov. 15, 2022 (CN) ......................... 202211426240.9

(51) Int. Cl.
*B01J 23/00* (2006.01)
*B01J 23/18* (2006.01)
*B01J 35/39* (2024.01)
*B01J 37/03* (2006.01)
*B01J 37/06* (2006.01)
*B01J 37/08* (2006.01)

(52) U.S. Cl.
CPC ............... *B01J 23/18* (2013.01); *B01J 35/39* (2024.01); *B01J 37/038* (2013.01); *B01J 37/06* (2013.01); *B01J 37/08* (2013.01)

(58) Field of Classification Search
CPC . B01J 23/18; B01J 35/39; B01J 37/038; B01J 37/06; B01J 37/08
USPC .......................................................... 502/353
See application file for complete search history.

(56) References Cited

FOREIGN PATENT DOCUMENTS

CN 114272943 A * 4/2022

* cited by examiner

*Primary Examiner* — James E Mcdonough
(74) *Attorney, Agent, or Firm* — Hemisphere Law, PLLC

(57) ABSTRACT

The invention discloses a composite photocatalyst of clay based bismuth phosphate homojunctions, preparation method and application thereof. The preparation method includes the following steps: S1, preparing a bismuth nitrate solution, sodium dihydrogen phosphate solution, and rectorite suspension; S2, adding bismuth nitrate solution into sodium dihydrogen phosphate solution, stirring thoroughly, then adding rectorite suspension for hydrothermal reaction, and finally separation, washing, and drying. This invention loads $BiPO_4$ onto the rectorite while preparing $BiPO_4$ through a one-step hydrothermal method. Due to the addition of rectorite, it can induce the $BiPO_4$ heterophase homojunction structure composed of hexagonal phase and monazite monoclinic phase, improving the separation ability of electrons and holes. In addition, composite rectorite can enhance the adsorption performance of the catalyst, reduce the recombination rate of electron-hole pairs, and significantly improve the photocatalytic performance of the catalyst through the synergistic effect of the two aspects.

8 Claims, 1 Drawing Sheet

COMPOSITE PHOTOCATALYST OF CLAY BASED BISMUTH PHOSPHATE HOMOJUNCTIONS, PREPARATION METHOD AND APPLICATION THEREOF

FIELD OF THE DISCLOSURE

The disclosure relates to a composite photocatalyst of clay based bismuth phosphate homojunctions, preparation method and application thereof, which belongs to the field of photocatalytic technology.

BACKGROUND

Photocatalytic technology has advantages such as renewability, high efficiency, and ecological friendliness. Due to its ability to directly absorb and utilize light energy, this technology can cause organic pollutants to be oxidized, decomposed, and even mineralized, thereby achieving complete mineralization of complicated organic pollutants. It has the advantages of energy conservation, economy, and no secondary pollution. In recent years, this technology has been highly valued in the field of environmental pollution prevention and control.

However, traditional photocatalytic materials (such as $TiO_2$) have shortcomings such as poor adsorption performance and electron-hole easy to combine, resulting in low utilization of solar energy and low photocatalytic efficiency. In 2010, Zhu Yongfa's research group first used $BiPO_4$ semiconductor materials for photocatalytic degradation of pollutants. Under the excitation of ultraviolet light, $BiPO_4$ semiconductor materials showed strong photocatalytic activity. Since then, low-cost and highly active $BiPO_4$ has become a suitable substitute for $TiO_2$. Although $BiPO_4$ exhibits excellent photocatalytic activity, there are still some shortcomings in practical applications, such as a wide band gap, only responding to ultraviolet light, low light utilization efficiency, and low quantum yield. In order to broaden the spectral response range of $BiPO_4$ and improve its photocatalytic activity, researchers composite $BiPO_4$ with semiconductors such as g-$C_3N_4$, $Bi_2WO_6$, and $Ag_3PO_4$ to form a heterojunction structure. As disclosed in Chinese patent CN112138700A, a bismuth phosphate based heterojunction photocatalyst and its preparation method are disclosed. The photocatalyst is a heterojunction photocatalyst composed of bismuth phosphate and graphite phase carbon nitride. The preparation method comprises the following steps: preparing nano-rod like $BiPO_4$ by microwave, preparing light-weight g-$C_3N_4$ by calcination, and compounding g-$C_3N_4$ with $BiPO_4$ by ball milling to obtain a heterojunction photocatalyst g-$C_3N_4$/$BiPO_4$. The heterojunction photocatalyst prepared in the invention has high activity, high light utilization rate, good stability, and reusability. However, this improved technology requires the preparation of two materials separately, and then the composite of these two materials. This leads to complex preparation processes, high raw material, and high costs.

Therefore, it has great significance to provide a visible light catalyst with a simple preparation method and high photocatalytic activity.

SUMMARY

The present invention discloses a preparation method for a composite photocatalyst of clay based bismuth phosphate homojunctions for solving the prior art's shortcomings. This method adds rectorite to the precursor of $BiPO_4$ and loads it onto the rectorite while preparing $BiPO_4$ through a one-step hydrothermal method. Due to the addition of rectorite, it can induce the $BiPO_4$ heterophase homojunction structure composed of hexagonal phase and monazite monoclinic phase, improving the separation ability of electrons and holes. In addition, composite rectorite can enhance the adsorption performance of the catalyst, reduce the recombination rate of electron-hole pairs, and significantly improve the photocatalytic performance of the catalyst through the synergistic effect of the two aspects.

To achieve the above technical objectives, the following technical solutions are adopted in this application:

A preparation method of a composite photocatalyst of clay based bismuth phosphate homojunctions includes the following steps:

S1, dissolving bismuth nitrate in a mixture of ethanol, ethylene glycol, and glycerol to obtain a bismuth nitrate solution; dissolving sodium dihydrogen phosphate in deionized water to obtain a sodium dihydrogen phosphate solution; dispersing rectorite in deionized water to obtain a rectorite suspension.

S2, adding the bismuth nitrate solution obtained in step S1 dropwise to the sodium dihydrogen phosphate solution, stirring thoroughly, and then adding the rectorite suspension for hydrothermal reaction; finally, after separation, washing, and drying, the composite photocatalyst of clay based bismuth phosphate homojunctions is obtained.

The present invention uses bismuth nitrate, sodium dihydrogen phosphate, and rectorite as raw materials. This method adds rectorite to the precursor of $BiPO_4$ and loads it onto the rectorite through a one-step hydrothermal method while preparing $BiPO_4$. The preparation method is simple. During the hydrothermal process, the rectorite inhibits the transformation of $BiPO_4$ from hexagonal phase to monazite monoclinic phase, resulting in only a portion of the hexagonal phase transforming into monazite monoclinic phase. So the prepared $BiPO_4$ has a heterophase homojunction structure composed of hexagonal phase and monazite monoclinic phase. The heterophase homojunction structure can improve the separation ability of electrons and holes, and improve the separation ability of photo-generated carriers. In addition, the rectorite enhances the adsorption performance of the catalyst by loading $BiPO_4$ onto the rectorite. Pollutants are adsorbed onto the surface of the catalyst, making it easier for photo-generated electrons to combine with pollutants to oxidize them, and reducing the recombination rate of electrons and holes. Through the synergistic effect of the two aspects, the photocatalytic performance of the catalyst is significantly improved, and a photocatalyst with excellent degradation effect under visible light is prepared.

Preferably, in the step S1, the rectorite includes at least one of organic pillared rectorite, Na-rectorite, and inorganic pillared rectorite.

Preferably, in the step S2, the temperature of the hydrothermal reaction is 155-165 °C, and the reaction time is 2.5-3.5 h. Farthmore. More precisely, the temperature of the hydrothermal reaction is 160 °C, and the reaction time is 3 h.

Preferably, in the step S2, the molar ratio of bismuth nitrate to sodium dihydrogen phosphate is 1:(1-1.2); the mass of the rectorite is 30-50% of the mass of the bismuth phosphate $BiPO_4$.

Preferably, in the step S1, the concentration of bismuth nitrate in the bismuth nitrate solution is 0.15-0.17 mol/L; the concentration of sodium dihydrogen phosphate in the sodium dihydrogen phosphate solution is 0.30-0.35 mol/L; the concentration of rectorite in the rectorite suspension is 0.01-0.02 g/mL.

Preferably, in the step S1, the volume ratio of ethanol, ethylene glycol, and glycerol is 5:3:2.

Preferably, in the step S2, after the reaction is completed, collecting the reaction sediment and washing it separately with anhydrous ethanol and deionized water.

The present invention also provides a composite photocatalyst of clay based bismuth phosphate homojunctions obtainable by the aforementioned preparation method. The bismuth phosphate $BiPO_4$ has a heterophase homojunction structure composed of hexagonal phase and monazite monoclinic phase.

The present invention also provides an application that the composite photocatalyst of clay based bismuth phosphate homojunctions is applied to photocatalytic degradation of organic pollutants.

The advantages of the present invention are as follows:

The preparation method of the present invention is simple. This method adds rectorite to the precursor of $BiPO_4$ and loads it onto the rectorite through a one-step hydrothermal method while preparing $BiPO_4$. During the hydrothermal process, the rectorite inhibits the transformation of $BiPO_4$ from hexagonal phase to monazite monoclinic phase, resulting in only a portion of the hexagonal phase transforming into monazite monoclinic phase. So the prepared $BiPO_4$ has a heterophase homojunction structure composed of hexagonal phase and monazite monoclinic phase. The heterophase homojunction structure can improve the separation ability of electrons and holes, and improve the separation ability of photo-generated carriers. In addition, the rectorite enhances the adsorption performance of the catalyst by loading $BiPO_4$ onto the rectorite. Pollutants are adsorbed onto the surface of the catalyst, making it easier for photo-generated electrons to combine with pollutants to oxidize them, and reducing the recombination rate of electrons and holes. Through the synergistic effect of the two aspects, the photocatalytic performance of the catalyst is significantly improved, and a photocatalyst with excellent degradation effect under visible light is prepared.

BRIEF DESCRIPTION OF THE DRAWINGS

Accompanying drawings are for providing further understanding of embodiments of the disclosure. The drawings form a part of the disclosure and illustrate the principle of the embodiments of the disclosure along with the literal description. The drawings in the description below are merely some embodiments of the disclosure; a person skilled in the art can obtain other drawings according to these drawings without creative efforts. In the figures.

DETAILED DESCRIPTION OF PREFERRED EMBODIMENTS

Figure 1:
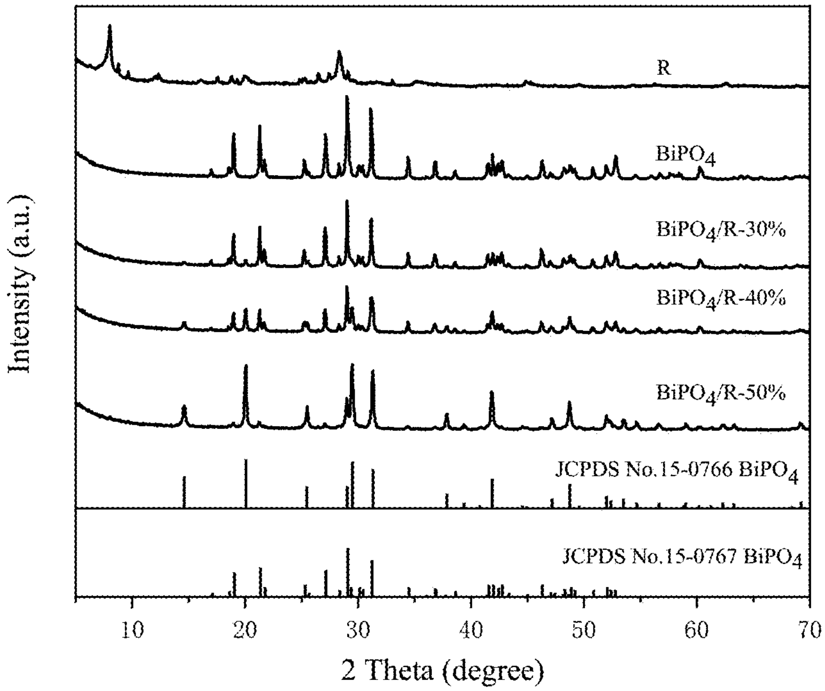
FIG. 1 shows the X-ray diffraction patterns of Na-rectorite, and samples prepared in Example 1-3 and Comparative Example 1, wherein the R in the figure represents Na-rectorite.

The following is a clear and complete description of the technical solution in conjunction with some embodiments of the present invention. Obviously, the following embodiments are only a part of the embodiments of the present invention, not all of them. Based on the embodiments in the present invention, all other embodiments obtained by ordinary technical personnel in the art without creative labor fall within the scope of protection of the present invention.

Example 1

In this example, the preparation method of a composite photocatalyst of clay based bismuth phosphate homojunctions includes the following steps:

S1, dissolving 1.5960 g $Bi(NO_3)_3 \cdot 5H_2O$ in a mixture of 10 mL ethanol, 6 mL ethylene glycol, and 4 mL glycerol to obtain a bismuth nitrate solution by sonicate for 10 min; dissolving 0.5133 g $NaH_2PO_4 \cdot 2H_2O$ in 10 mL deionized water, and stirring for 10 min to obtain a sodium dihydrogen phosphate solution; dispersing 0.3 g Na-rectorite in 30 mL deionized water, and stirring for 40 min to obtain a rectorite suspension.

S2, adding the bismuth nitrate solution obtained in step S1 dropwise to the sodium dihydrogen phosphate solution, stirring thoroughly, and then adding the rectorite suspension; then stirring at a speed of 500 r/min for 2 h and transfer the reaction liquid to a hydrothermal reactor; the hydrothermal condition is at 160 °C for 3 h; after the hydrothermal reaction is completed, cooling down and separating the gray precipitate; finally, washing the gray precipitate alternately with ethanol absolute and deionized water three times, and drying at 60 °C to obtain the composite photocatalyst of $BiPO_4$/rectorite homojunctions, denoted as $BiPO_4$/R-30% (the mass of Na-rectorite is 30% of the mass of $BiPO_4$).

Example 2

The preparation method in Example 2 is basically the same as Example 1, except that in Step S1, the mass of Na-rectorite is 0.4 g, and the obtained composite photocatalyst of $BiPO_4$/rectorite homojunctions is denoted as $BiPO_4$/R-40% (the mass of Na-rectorite is 40% of the mass of $BiPO_4$).

Example 3

The preparation method in Example 3 is basically the same as Example 1, except that in Step S1, the mass of Na-rectorite is 0.5 g, and the obtained composite photocatalyst of $BiPO_4$/rectorite homojunctions is denoted as $BiPO_4$/R-50% (the mass of Na-rectorite is 50% of the mass of $BiPO_4$).

Example 4

In this example, the preparation method of a composite photocatalyst of clay based bismuth phosphate homojunctions includes the following steps:

S1, dissolving 1.5960 g $Bi(NO_3)_3 \cdot 5H_2O$ in a mixture of 10 mL ethanol, 6 mL ethylene glycol, and 4 mL glycerol to obtain a bismuth nitrate solution by sonicate for 20 min; dissolving 0.5133 g $NaH_2PO_4 \cdot 2H_2O$ in 10 mL deionized water, and stirring for 5 min to obtain a sodium dihydrogen phosphate solution; dispersing 0.3 g organic pillared rectorite in 30 mL deionized water, and stirring for 30 min to obtain a rectorite suspension.

S2, adding the bismuth nitrate solution obtained in step S1 dropwise to the sodium dihydrogen phosphate solution, stirring thoroughly, and then adding the rectorite suspension; then stirring at a speed of 600 r/min for 2.5 h and transfer the reaction liquid to a hydrothermal reactor; the hydrothermal condition is at 165 °C for 2.5 h; after the hydrothermal reaction is completed, cooling down and separating the gray precipitate; finally, washing the gray precipitate alternately with ethanol absolute and deionized water three times, and drying at 60 °C to obtain the composite photocatalyst of $BiPO_4$/rectorite homojunctions, denoted as $BiPO_4$/R-30%.

Comparative Example 1

In this comparative example, the preparation method of a composite photocatalyst of clay based bismuth phosphate homojunctions includes the following steps:

S1, dissolving 1.5960 g $Bi(NO_3)_3 \cdot 5H_2O$ in a mixture of 10 mL ethanol, 6 mL ethylene glycol, and 4 mL glycerol to obtain a bismuth nitrate solution by sonicate for 20 min; dissolving 0.5133 g $NaH_2PO_4 \cdot 2H_2O$ in 10 mL deionized water, and stirring for 5 min to obtain a sodium dihydrogen phosphate solution.

S2, adding the bismuth nitrate solution obtained in step S1 dropwise to the sodium dihydrogen phosphate solution, stirring thoroughly at a speed of 500 r/min for 2 h and transfer the reaction liquid to a hydrothermal reactor; the hydrothermal condition is at 160 °C for 3 h; after the hydrothermal reaction is completed, cooling down and separating the gray precipitate; finally, washing the precipitate alternately with ethanol absolute and deionized water three times, and drying at 60 °C to obtain the $BiPO_4$ photocatalyst, denoted as $BiPO_4$.

Compared with Example 1, the preparation method for this comparative example did not add Na-rectorite.

FIG. 1 shows the X-ray diffraction patterns of Na-rectorite, and samples prepared in Example 1-3 and Comparative Example 1, wherein the R in the figure represents Na-rectorite. From FIG. 1, it can be seen that the $BiPO_4$ prepared in comparative Example 1 only has monazite monoclinic phase. The composite photocatalyts prepared in Examples 1-3 all contain two crystal phases: hexagonal phase and monazite monoclinic phase. With the increase of Na-rectorite addition, the diffraction peak intensity of the hexagonal phase increases. The reason is that $BiPO_4$ is a hexagonal phase at room temperature, and the hexagonal phase will transform into monazite monoclinic phase at high temperature. The addition of rectorite inhibits the transformation process, so the prepared composite photocatalysts all contain two crystal phases, which form a heterophase homojunction structure. The characteristic diffraction peak of the rectorite in the composite photocatalysts prepared in Examples 1-3 disappears, indicating that the layered structure of the rectorite has been destroyed.

Figure 2:
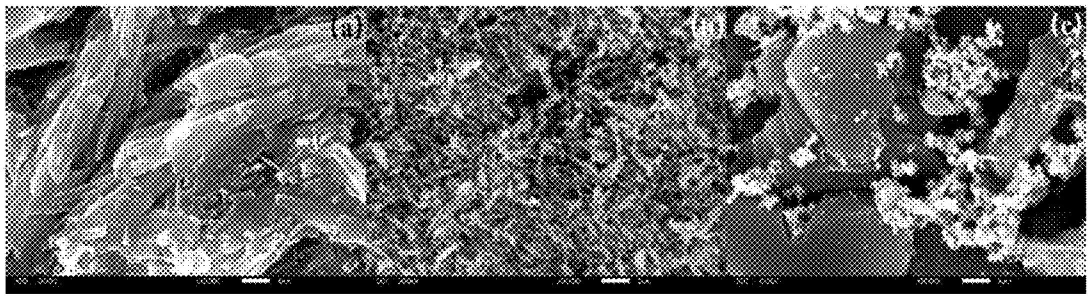
FIG. 2 shows the SEM image of samples, wherein FIG. 2(*a*) shows the SEM image of Na-rectorite, FIG. 2(*b*) shows the SEM image of samples prepared in Comparative Example 1, and FIG. 2(*c*) shows the SEM image of samples prepared in Example 2.

FIG. 2 shows the SEM image of samples, wherein FIG. 2(*a*) shows the SEM image of Na-rectorite, FIG. 2(*b*) shows the SEM image of $BiPO_4$ prepared in Comparative Example 1, and FIG. 2(*c*) shows the SEM image of the composite photocatalyst of $BiPO_4$/rectorite homojunctions prepared in Example 2. From the figure, it can be seen that the rectorite has a layered structure, while $BiPO_4$ has a rod-shaped structure. After the combination of the two, the structure changed. The layered structure of rectorite was destroyed, and a spherical hexagonal phase $BiPO_4$ was appeared, consistent with the XRD results.

Test 1

The composite photocatalyst of $BiPO_4$/rectorite homojunctions prepared in Examples 1-3 and the $BiPO_4$ photocatalyst prepared in Comparative Example 1 are used for photocatalytic degradation of tetracycline (TC) and Rhodamine B (RhB) to evaluate the photocatalytic activity of photocatalysts.

The process of TC degradation is as follows: the initial concentration of TC is 10 mg/L, the amount of photocatalyst used is 0.05 g, and a 420 nm visible light LED lamp is used as the light source. After adding the photocatalyst, it is first stirred under dark conditions until the photocatalyst reaches adsorption saturation on TC; Then turn on the light source, absorb a small amount of reaction solution at a certain interval. After centrifugation at 4000 r/min for 5 min, the absorbance of the reaction solution was measured by using a UV visible spectrophotometer to calculate the degradation rate of TC over a certain period of time, which can then evaluate the photocatalytic activity of the photocatalyst.

The process of RhB degradation is as follows: the initial concentration of TC is 10 mg/L, the amount of photocatalyst used is 0.05 g, and a 420 nm visible light LED lamp is used as the light source. After adding the photocatalyst, it is first stirred under dark conditions until the photocatalyst reaches adsorption saturation on RhB; Then turn on the light source, absorb a small amount of reaction solution at a certain interval. After centrifugation at 4000 r/min for 5 min, the absorbance of the reaction solution was measured by using a UV visible spectrophotometer to calculate the degradation rate of RhB over a certain period of time, which can then evaluate the photocatalytic activity of the photocatalyst.

Figure 3:
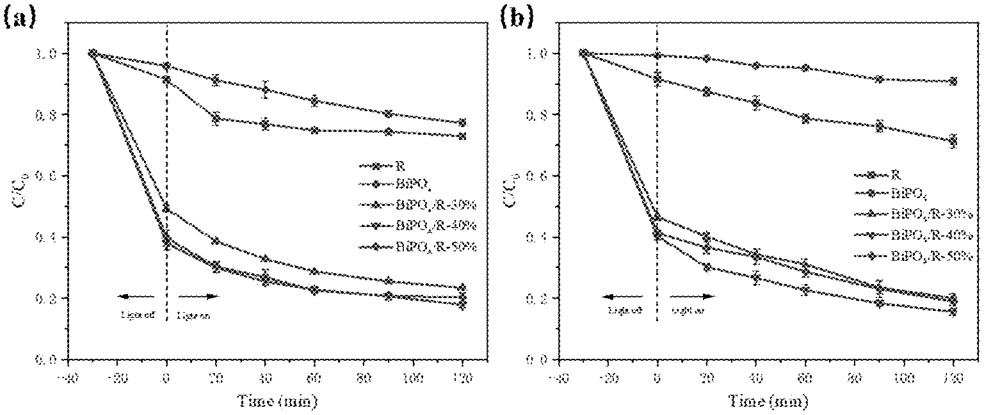
FIG. 3 shows the degradation efficiency image of Na-rectorite and samples prepared in Example 1-3 and Comparative Example 1 on tetracycline and Rhodamine B, wherein FIG. 3(*a*) shows the degradation efficiency image of tetracycline, and FIG. 3(*b*) shows the degradation efficiency image of Rhodamine B.

FIG. 3 shows the degradation efficiency image of Na-rectorite and samples prepared in Example 1-3 and Comparative Example 1 on tetracycline and Rhodamine B, wherein FIG. 3(*a*) shows the degradation efficiency image of tetracycline, and FIG. 3(*b*) shows the degradation efficiency image of Rhodamine B. From FIG. 3, it can be seen that a single rectorite or $BiPO_4$ has low degradation rates for tetracycline and Rhodamine B, while the $BiPO_4$/R-40% prepared in Example 2 of the present invention has degradation rates of 84% and 86% for tetracycline and rhodamine B, respectively. This indicates that the composite photocatalyst of $BiPO_4$/rectorite homojunctions prepared by the method of the present invention has excellent photocatalytic activity.

The reason why the photocatalytic activity of the composite photocatalyst of $BiPO_4$/rectorite homojunctions prepared by the present invention is significantly improved is: the addition of rectorite induces the formation of $BiPO_4$ heterophase homojunction structure. This charge transfer mechanism not only effectively separates photo-generated carriers, but also ensures their strong redox ability; secondly, the combination of $BiPO_4$ and rectorite enhances the adsorption capacity of the photocatalyst, reduces the electron-hole recombination rate, and significantly improves the photocatalytic performance of the material through the synergistic effect of the two aspects.

The above descriptions are only preferred embodiments of the present invention and are not intended to limit the present invention. Any modification, equivalent replacement, improvement, etc., made within the spirit and principle of the present invention shall be included in the protection of the present invention.

What is claimed is:

1. A preparation method of a composite photocatalyst of clay based bismuth phosphate homojunctions, including the following steps:

S1, dissolving bismuth nitrate in a mixture of ethanol, ethylene glycol, and glycerol to obtain a bismuth nitrate solution; dissolving sodium dihydrogen phosphate in deionized water to obtain a sodium dihydrogen phosphate solution; dispersing rectorite in deionized water to obtain a rectorite suspension;

S2, adding the bismuth nitrate solution obtained in step S1 dropwise to the sodium dihydrogen phosphate solution, stirring thoroughly, and then adding the rectorite suspension for hydrothermal reaction; finally, after separation, washing, and drying, the composite photocatalyst of clay based bismuth phosphate homojunctions is obtained.

2. The preparation method of claim 1, in the step S1, the rectorite includes at least one of organic pillared rectorite, Na-rectorite, and inorganic pillared rectorite.

3. The preparation method of claim 1, in the step S2, the temperature of the hydrothermal reaction is 155-165 °C, and the reaction time is 2.5-3.5 h.

4. The preparation method of claim 1, in the step S2, the temperature of the hydrothermal reaction is 160 °C, and the reaction time is 3 h.

5. The preparation method of claim 1, in the step S2, the molar ratio of bismuth nitrate to sodium dihydrogen phosphate is 1:(1-1.2); the mass of the rectorite is 30-50% of the mass of the bismuth phosphate $BiPO_4$.

6. The preparation method of claim 1, in the step S1, the concentration of bismuth nitrate in the bismuth nitrate solution is 0.15-0.17 mol/L; the concentration of sodium dihydrogen phosphate in the sodium dihydrogen phosphate solution is 0.30-0.35 mol/L; the concentration of rectorite in the rectorite suspension is 0.01-0.02 g/mL.

7. The preparation method of claim 1, in the step S1, the volume ratio of ethanol, ethylene glycol, and glycerol is 5:3:2.

8. The preparation method of claim 1, in the step S2, after the reaction is completed, collecting the reaction sediment and washing it separately with anhydrous ethanol and deionized water.

* * * * *